United States Patent
Yam et al.

(10) Patent No.: US 11,181,960 B2
(45) Date of Patent: Nov. 23, 2021

(54) POWER OVER ETHERNET (POE) POWER MANAGEMENT

(71) Applicant: Arista Networks, Inc., Santa Clara, CA (US)

(72) Inventors: Eric Jahfei Won Yam, Santa Clara, CA (US); Robert Calvin Cyphers, Fremont, CA (US); Charles Melvin Aden, Berkeley, CA (US); Eudean Michael Sun, Walnut Creek, CA (US); Dipankar Bhatt Acharya, Saratoga, CA (US)

(73) Assignee: Arista Networks, Inc., Santa Clara, CA (US)

( * ) Notice: Subject to any disclaimer, the term of this patent is extended or adjusted under 35 U.S.C. 154(b) by 114 days.

(21) Appl. No.: 16/554,592

(22) Filed: Aug. 28, 2019

(65) Prior Publication Data

US 2020/0076627 A1 Mar. 5, 2020

Related U.S. Application Data

(60) Provisional application No. 62/726,304, filed on Sep. 2, 2018.

(51) Int. Cl.
| | |
|---|---|
| *G06F 1/28* | (2006.01) |
| *G06F 1/30* | (2006.01) |
| *G06F 1/3206* | (2019.01) |
| *H04L 12/10* | (2006.01) |
| *H04L 12/26* | (2006.01) |
| *G05F 1/46* | (2006.01) |

(52) U.S. Cl.
CPC ............. *G06F 1/28* (2013.01); *G06F 1/30* (2013.01); *G06F 1/3206* (2013.01); *H04L 12/10* (2013.01); *H04L 43/0817* (2013.01); *G05F 1/46* (2013.01)

(58) Field of Classification Search
CPC . G06F 1/28; G06F 1/30; G06F 1/3206; H04L 12/10; H04L 43/0817; G05F 1/46
See application file for complete search history.

(56) References Cited

U.S. PATENT DOCUMENTS

| | | | |
|---|---|---|---|
| 7,478,251 B1 * | 1/2009 | Diab | G06F 1/189 |
| | | | 713/300 |
| 8,676,393 B1 * | 3/2014 | Hupton | G06Q 50/06 |
| | | | 700/295 |
| 2004/0268166 A1 | 12/2004 | Farkas et al. | |
| 2005/0272402 A1 | 12/2005 | Ferentz et al. | |
| 2012/0066519 A1 | 3/2012 | El-Essawy et al. | |
| 2014/0245031 A1 | 8/2014 | Hamdi et al. | |

(Continued)

*Primary Examiner* — Gary Collins
(74) *Attorney, Agent, or Firm* — Fountainhead Law Group P.C.

(57) ABSTRACT

Methods and systems for managing power for a Power over Ethernet (PoE) device are disclosed herein. The method may include obtaining, by a supervisor, power information from a plurality of power supply units (PSUs) to obtain total consumed power; obtaining, by the supervisor, a total system power capacity value associated with the plurality of PSUs; and calculating, by the supervisor, a total available PoE power value using the total consumed power and the total system power capacity value; and making a first determination, by the supervisor, using the total available PoE power value and a PoE power table, whether a powered device should stop receiving power.

20 Claims, 6 Drawing Sheets

(56) References Cited

U.S. PATENT DOCUMENTS

| | | |
|---|---|---|
| 2015/0067379 A1 | 3/2015 | Tashima |
| 2015/0121104 A1 | 4/2015 | Kinouchi |
| 2015/0244834 A1 | 8/2015 | Zuo et al. |
| 2017/0293341 A1 | 10/2017 | Jenne et al. |
| 2017/0257305 A1 | 12/2017 | Ragupath et al. |
| 2018/0032120 A1 | 2/2018 | Maheswaran et al. |
| 2019/0213700 A1 | 1/2019 | Kobayashi |
| 2020/0073457 A1 | 3/2020 | Aden et al. |
| 2020/0076626 A1 | 3/2020 | Yam et al. |
| 2020/0076628 A1 | 3/2020 | Yam et al. |

* cited by examiner

Input Pin Interface Keep On Order Table 600

| Value Sent by Supervisor | Interface 1 | Interface 2 | Interface 3 | Interface 4 | Interface 5 | Interface 6 | Interface 7 | Interface 8 |
|---|---|---|---|---|---|---|---|---|
| 0 | OFF | OFF | OFF | OFF | OFF | OFF | OFF | OFF |
| 1 | OFF | ON | OFF | OFF | OFF | OFF | OFF | OFF |
| 2 | OFF | ON | ON | OFF | OFF | OFF | OFF | OFF |
| 3 | OFF | ON | ON | OFF | ON | OFF | OFF | OFF |
| 4 | OFF | ON | ON | ON | ON | OFF | OFF | OFF |
| 5 | OFF | ON | ON | ON | ON | OFF | ON | OFF |
| 6 | OFF | ON | ON | ON | ON | ON | ON | OFF |
| 7 | OFF | ON | ON | ON | ON | ON | ON | ON |
| 8 | ON | ON | ON | ON | ON | ON | ON | ON |

FIG. 6

POWER OVER ETHERNET (POE) POWER MANAGEMENT

CROSS REFERENCE TO RELATED APPLICATIONS

This patent application claims the benefit of U.S. Provisional Patent Application Ser. No. 62/726,304 filed on Sep. 2, 2018 under 35 U.S.C. § 119(e). U.S. Provisional Patent Application Ser. No. 62/726,304 is incorporated herein by reference in its entirely.

BACKGROUND

Power over Ethernet (PoE) power sourcing equipment (PSE) devices (e.g., network devices) may be a source of power for any number of powered devices (PDs) (e.g., phones, wireless access points, cameras, etc.) via interfaces of the PoE capable devices. Such power may be provided using power from any number of power supply units (PSUs) in the PSE.

The PSE controller components of PSEs often have relatively simple models for managing the power delivered to PDs. Such power models often consist of software assigning interfaces providing power to PDs into bins tied to the number of available power supply units (PSUs). When the first PSU fails, the first bin is disabled. When the next PSU fails, the second bin is shut down, and so on until only one PSU remains. Such a design may require large power reserves as guard bands when over-subscribing power, because the total system power consumption is not available in real-time and is not part of the real-time operation of the PSE controller components. Interfaces may be turned off (or never enabled) even when adequate power is available. Thus, in certain scenarios, additional PSUs may be required to get a certain amount of reliable PoE power. Software may continuously poll the PSUs and read the per-port power consumption in the PSE controller components and adjust the placement of ports into bins, but such polling may have longer time delays compared to a hardware solution, which makes such a technique less accurate and requires larger guard bands.

SUMMARY

In general, in some aspects, embodiments described herein relate to a method for power management for a Power over Ethernet (PoE) device. The method may include obtaining, by a supervisor, power information from a plurality of power supply units (PSUs) to obtain total consumed power; obtaining, by the supervisor, a total system power capacity value associated with the plurality of PSUs; and calculating, by the supervisor, a total available PoE power value using the total consumed power and the total system power capacity value; and making a first determination, by the supervisor, using the total available PoE, power value and a PoE power table, whether a powered device should stop receiving power.

In general, in some aspects, embodiments described herein relate to a system for power management for a Power over Ethernet (PoE) device. The system may include a plurality of power supply units (PSUs) and a power sourcing equipment (PSE) controller component comprising a plurality of Power over Ethernet (PoE) interfaces. Each PoE interface of the plurality of PoE interfaces may be operatively connected to a different powered device of a set of powered devices. The system may also include a supervisor operatively connected to the plurality of PSUs and the PSE controller component. The supervisor may be configured to: obtain power information from the plurality of PSUs to obtain total power; obtain a total system power capacity value associated with the plurality of PSUs; calculate a total available PoE power value using the total consumed power and the total system power capacity value; and make a first determination using the total available PoE power value and a PoE power table, whether a powered device should stop receiving power.

Other aspects of the embodiments disclosed herein will be apparent from the following description and the appended claims.

BRIEF DESCRIPTION OF DRAWINGS

FIG. 6 shows an example in accordance with one or more embodiments disclosed herein.

DETAILED DESCRIPTION

Figure 1:
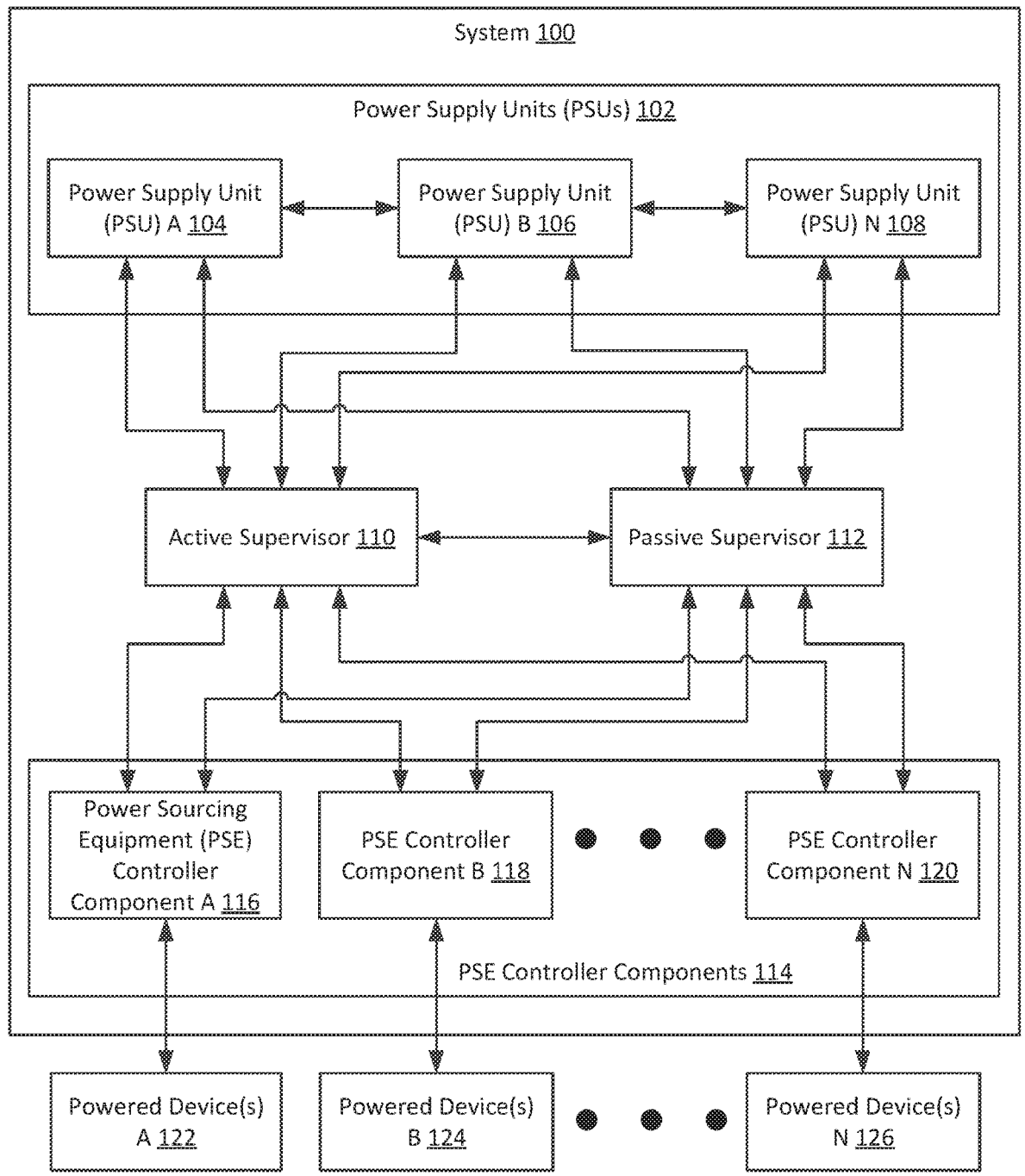
FIG. 1 shows a system in accordance with one or more embodiments disclosed herein.

Specific embodiments will now be described with reference to the accompanying figures. In the following description, numerous details are set forth as examples of the embodiments disclosed herein. It will be understood by those skilled in the art, and having the benefit of this Detailed Description, that one or more embodiments disclosed herein may be practiced without these specific details and that numerous variations or modifications may be possible without departing from the scope of embodiments described herein. Certain details known to those of ordinary skill in the art may be omitted to avoid obscuring the description.

In the following description of the figures, any component described with regard to a figure, in various embodiments disclosed herein, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments disclosed herein, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments disclosed herein relate to a feature for PSUs in a PSE device (i.e., a device capable of sourcing power over Ethernet to one or more powered devices (PDs)) to send real-time (or near real-time) output power measurements to a system controller (e.g., a supervisor) that can compare the measured output power measurements with available power to determine whether and how much power load to shed (e.g., stopping the provision of power to one or more PoE interfaces) to keep the system operational. Further, embodiments disclosed herein relate to management of PoE interfaces based on real-time (or near real-time) information related to available PoE power and power consumption of the ports and the system in which the ports are located.

Embodiments disclosed herein therefore relate to methods and systems for power management of a PSE device (e.g., a modular network device). In one or more embodiments, power information from power supply units (PSUs) is delivered to the supervisor via a single wire per PSU, which requires less wiring and signals within the PSE device. Such a wire may transmit various items of information, such as the power being provided by the PSU, whether the input current signal is being provided, whether the PSU is outputting current, etc. Such information may be encoded as a string of binary digits and transmitted as a modulated signal encoding the binary digits.

In one or more embodiments, the supervisor receives the power information from PSUs regarding current power consumption of the PSUs, as well as other information relating to total available power that the collection of PSUs may provide. Using such information, along with other information relating to power allocated to other components of the system and desired power guard band values, the supervisor may calculate the total power system capacity to provide power to powered devices via PoE interfaces of the system.

In one or more embodiments, a supervisor also maintains a table of interfaces (e.g., PoE interfaces) that are capable of providing power to operatively connected powered devices, the power consumption of such interfaces, and an interface keep-on order that prioritizes the interfaces in regards to which interfaces should remain in the event of a situation where a device (e.g., a network device) cannot meet the power requirements of all powered devices. As an intermediate device between the PSUs and the PoE interfaces, the supervisor may be used to manage which interfaces of a system receive power and, in the event of a power disruption, perform one or more actions to maintain the supply of power to all, or a portion of, the interfaces of the system.

In one or more embodiments, the supervisor includes functionality to detect that a PSU has surpassed a power threshold, and is thus in danger of failing. In response to that determination, the supervisor includes functionality to perform one or more tasks to reduce power consumption (e.g., of one or more PoE interfaces) in order to keep the system, or some part of the system, operational.

In one or more embodiments, the real-time near real-time) information provided to the supervisor by the PSUs and PSE controller components regarding power being provided and consumed allows the supervisor to quickly take action to reduce the power load, thereby avoiding failure of the system as a whole due to cascading PSU failures. Such actions may be taken in a short time window that is less than the time that PSUs are capable of operating over their rated power limit. Such a time window may be provided, at least in part, by having PSUs configured with overcurrent protection points that are a percentage above rated current that is higher than the percentage current sharing accuracy of the PSUs. Such a configuration may allow a PSU to provide more current, while drooping voltage to avoid failure. In one or more embodiments, while experiencing overcurrent, a PSU may reduce their voltage output and become a current source. Other PSUs of the system may respond by raising their power output to a maximum rated power output. Such actions may ensure that the system does not fail when excess power is available that is being unused, as well as provide the aforementioned time window to the supervisor to reduce power load by sending signals to one or more PSE controller components that cause a PSE controller component to turn off one or more PoE interfaces.

FIG. 1 shows a system in accordance with one or more embodiments disclosed herein. In one or more embodiments, the system (100) includes an active supervisor (110), a passive supervisor (112), power supplies units (PSUs) (102), and PSE controller components (114). As shown in FIG. 1, the PSUs (102) include PSU A (104), PSU B (106), and PSU N (108), and the PSE controller components (114) include PSE controller component A (116), PSE controller component B (118), and PSE controller component N (126). Also as shown in FIG. 1, PSE controller components (114) may be operatively connected to any number of powered devices (e.g., powered device(s) A (116), powered device(s) B (118), powered device(s) N 120)) via interfaces of the PSE controller component. Each of these components is described below.

In one or more embodiments, the system may be any device capable of providing PoE power to powered devices. For example, the system may be a modular network device. In one or more embodiments, a network device is a physical device that includes and/or is operatively connected to persistent storage (not shown), memory (e.g., random access memory (RAM)) (not shown), one or more processor(s) (e.g., integrated circuits) (not shown), and physical network interfaces (not shown), which may also be referred to as ports. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the physical network interfaces (i.e., ports) of the network device and to process the network traffic data units. In one or more embodiments, processing a network traffic data unit includes, but is not limited to, a series of one or more table lookups (e.g., longest prefix match (LPM) lookups, forwarding equivalence class (FEC) lookups, etc.) and corresponding actions (e.g., forward to a certain egress port, add a labeling protocol header, rewrite a destination address, encapsulate, etc.).

In one or more embodiments, a PSU (e.g., PSU A (104), PSU B (106), PSU N (108)) is a component that provides power to one or more other devices and/or components. In one or more embodiments, a PSU (e.g., PSU A (104), PSU B (106), PSU N (108)) includes one or more power inputs for receiving power from an external source, and one or more power outputs for providing power to other devices and/or components. For example, a PSU (104, 106, 108) may receive power via input current (e.g., alternating current (AC)) at a power input, convert the AC to direct current (DC) (if necessary), and provide, via output current, power to any one or more of devices. Additionally, in one or more embodiments, a PSU may regulate the amount of power transmitted by adjusting the amount of current and/or voltage transmitted.

In one or more embodiments, a PSU (104, 106, 108) may have a maximum rated power, current, and/or voltage. In one or more embodiments, a PSU (104, 106, 108) may also have a rated current sharing accuracy, which relates to the percentage of inaccuracy (i.e., imperfectness) of sharing current between PSUs providing power in parallel with one another. Current sharing accuracy may be a design specification of a PSU.

In one or more embodiments, a PSU (104, 106, 108) may also be configured with an overcurrent protection point. In one or more embodiments, an overcurrent protection point may be a current value above the rated current of a PSU that a PSU is able to output for a time window before the PSU fails. In one or more embodiments, while experiencing overcurrent, a PSU (104, 106, 108) may be configured to reduce voltage (i.e., voltage droop) so that the power output from the PSU does not exceed a level that causes PSU failure. In one or more embodiments, a group of PSUs (102) may be configured to provide power for a system in parallel. In such embodiments, the PSUs may be operatively connected so that they may communicate information relating to power output (e.g., voltage output, current output) to each other. Such operative connections may allow for a PSU that has reached an overcurrent protection point to droop voltage and maintain maximum current (i.e., become a current source) while the other PSUs increase power output to their respective maximum power ratings.

Typically, PoE systems require that all installed PSUs are the same capability, when the system has more than a few PSUs. However, one or more embodiments allow mixing PSUs of different output power ratings.

In one or more embodiments, PSE controller components (114) are components of the system that receive power from PSUs (102) and provide at least a portion of the power to connected powered devices (122, 124, 126) via interfaces of the PSE controller component. Such connections with the powered devices may include a cable (e.g., an Ethernet cable) over which power and/or information may be transmitted. PSE controller components (114) may be all or a portion of a line card of a network device. In one or more embodiments, a line card is a collection of hardware (e.g., circuitry) that includes functionality to provide operative connectivity between various network chips (not shown) and other components (e.g., physical interfaces, processors, storage, memory, shift registers, field programmable gate arrays (FPGAs) etc. and software components) of a network device. In one or more embodiments, interfaces (not shown) of PSE controller components (114) may have a keep-on order configured by a user or by software that defines the relative priority of the interfaces of a given PSE controller component. Such an interface keep-on order may be used to turn off power to one or more of the interfaces of a PSE controller component when so instructed by a supervisor (discussed below).

In one or more embodiments, a powered device (122, 124, 126) is any device that receives power from the PSUs (102) of the system (100) via an interface of a PSE controller component (116, 118, 120). Examples of a powered device include, but are not limited to, phones, wireless access points, cameras, switches, routers, computing devices, clocks, control systems, lighting, etc. In one or more embodiments, each powered device (122, 124, 126) may request and be allocated a maximum amount of power to be provided from the system. However, a powered device (122, 124, 126) may not consume the full amount of allocated power at all times. Such behavior may allow for oversubscription of power allocated to powered devices, meaning there may be more power allocated than the system (100) could provide if a collection of powered devices simultaneously attempted to draw more power than the system can provide. In one or more embodiments, some powered devices may be considered more important than others, which may be reflected in a global interface keep-on order that is programmed into a supervisor (discussed below) and an interface keep-on order that is programmed to each PSE controller component and only includes the keep-on order for interfaces of the PSE controller component. In one or more embodiments, all keep-on orders are maintained in a coherent manner, and may be updated from time to time. For example, a user may decide to change the relative priorities of the powered devices. As another example, powered devices may be connected to interfaces not previously connected to an interface, or powered devices may be unplugged from an interface.

In one embodiment of the invention, changes to the keep-on order of the supervisors and the PSE controller components may be performed coherently using two sets of priority registers inside both the supervisors and in each of the PSE controller components. In one or more embodiments, the specific registers used by a given PSE controller component is selected by a priority-select input pins and software in the system may control a bit in the supervisors that specifies the priority register to use in the supervisor. In such scenarios, a supervisor may control the PSE controller component priority-select input pins, in the same (or similar manner) to controlling value of the bits that control which interfaces should be powered on or off.

In one or more embodiments, the keep-on orders may be provided by software and stored as a linked list, where the head of the linked list is the highest priority port and the tail is the lowest priority port. In such embodiments, each entry may include a linked list pointer to the next lower priority interface. For example, the supervisor may support a 384-entry table implemented as a 512 row RAM with empty lines make addressing easier. This keep-on order values may be updated by software each time the power configuration changes.

In one or more embodiments, a supervisor (e.g., active supervisor (110), passive supervisor (112)) is any hardware (e.g., circuitry), component that includes functionality to receive power information (e.g., from PSUs (102), PSE controller components (114), a power manager executing on one or more processors (not shown) etc.) and/or performs one or more actions related to power in the system (100) (e.g., interacting with PSUs (102), interacting with PSE controller components (114), storing power related information, sending messages in response to power conditions, etc.). In one or more embodiments, a supervisor includes functionality to receive, organize, interpret, store, and/or take one or more actions in response to information regarding devices (e.g., PSUs (102), PSE controller components (114)) to which it is operatively connected. Further, in one or more embodiments, a supervisor may be able to send commands to any device to which it is operatively connected. In one or more embodiments, a supervisor includes hardware capable of implementing logical operations to achieve functionality related to one or more embodiments described herein.

Examples of a supervisor include, but are not limited to, any one or more integrated circuits (ICs), a field programmable gate array (FPGA), an application specific integrated circuit (ASIC), a microcontroller, and/or any device capable of being programmed with device logic and/or capable of executing instructions for performing various operations, and/or any combinations thereof.

Additionally, as shown in FIG. 1, each supervisor (110, 112) may independently operatively connect to each PSU (104, 106, 108) and/or to each PSE controller component (116, 118, 120). Further, the active supervisor (110) and the passive supervisor (112) may be operatively connected to each other. The operative connections between each supervisor (110, 112), each PSU (104, 106, 108), and each PSE controller component (116, 118, 120) may occur over a single wire. One of ordinary skill in the art and having the benefit of this Detailed Description would appreciate that any form of suitable communication between the supervisors (110, 112), the PSUs (104, 106, 108), and the PSE controller components (116, 118, 120) may be employed. Further, each supervisor (110, 112) may not be connected to each PSU (104, 106, 108) and/or each PSE controller component (116, 118, 120) independently. Rather, the supervisors (110, 112) may share connections between each PSU (104, 106, 108) and/or each PSE controller component (116, 118, 120). Additionally, certain PSE controller components (116, 118, 120) and/or PSUs (104, 106, 108) may be connected to only one supervisor (e.g., active supervisor (110)), while other. PSE controller components (116, 118, 120) and/or PSUs (104, 106, 108) may be connected to another supervisor (e.g., passive supervisor (112)).

In one or more embodiments, the active supervisor (110) and the passive supervisor (112) are operatively connected to enable communication between the two supervisors (110, 112). Further, as each supervisor (110, 112) may be independently connected to each PSE controller component (116, 118, 120) and each PSU (104, 106, 108), each supervisor (110, 112) may independently collect data from each PSE controller component (116, 118, 120) and each PSU (104, 106, 108), respectively. Therefore, for example, if the communication between the active supervisor (110) and any one particular PSE controller component (116, 118, 120) or PSU (104, 106, 108) becomes severed (or the data transmitted therein becomes otherwise unreadable) the active supervisor (110) may then be able to query the passive supervisor (112) to obtain that missing or corrupt data. Conversely, the passive supervisor (112) may be able to query the active supervisor (110) to obtain any data that is missing, unavailable, or otherwise corrupt.

In one or more embodiments, as described above, the active supervisor (110) and the passive supervisor (112) each receive information from the PSUs (102) and the PSE controller components (114), and are operatively connected to one another. In one or more embodiments, such information and operative connection allow the active supervisor (110) and the passive supervisor (112) to have the same state, effectively mimicking one another. Each supervisor (110, 112) having the same state may allow for the passive supervisor (112) to take over controlling the provision of power to PoE interfaces in the event the active supervisor fails.

In one or more embodiments, a supervisor (110, 112) having and/or receiving power related information regarding both PSUs (102) and PSE controller components (114) allows power to PSE controller components (114) and, therefore, to powered devices (122, 124, 126) via interfaces of the PSE controller components (114) to be as granular, selective, or comprehensive as desired, or as the system otherwise requires. For example, a system (100) may have hundreds of interfaces spread amongst any number of PSE controller components (114), and the supervisor may have the capability to stop power from being provided to any of the interfaces down to a per-interface level.

In one or more embodiments, the supervisor includes functionality to detect cases where the consumed power exceeds the available power. In such a scenario the supervisor must shed sufficient power loads in real-time (or near real-time) to avoid the PSUs getting overcurrent faults and the system shutting down. Shedding loads (e.g., powered devices (122, 124, 126)) may be required in any number of scenarios, including, but not limited to: when power is over-subscribed and the actual consumed power of the powered devices increases past the available power; when one or more PSUs lose their input line power; and when one or more PSUs fail or are expectedly withdrawn from the PoE system (e.g., system (100)).

In one or more embodiments, a system such as that shown in FIG. 1, also includes software and/or firmware stored in any data repository (not shown) and/or memory (not shown) (i.e., non-transitory computer readable mediums). Such software and/or firmware may include instructions which, when executed by the one or more processors (not shown) of the system, cause the one or more processors to perform operations in accordance with one or more embodiments. The instructions may be in the form of computer readable program code to perform embodiments disclosed herein, and may be stored, in whole or in part, temporarily or permanently, on a non-transitory computer readable medium such as optical media (e.g., compact disc (CD), digital versatile disc (DVD), etc.), magnetic storage (e.g., hard disk drive (HDD), floppy disk, tape, diskette, etc.), integrated circuit storage (e.g., flash memory, solid-state drive (SSD), etc.), storage device, physical memory, or any other computer readable storage medium.

While FIG. 1 shows a configuration of components, other configurations may be used without departing from the scope of the embodiments disclosed herein. For example, although PSUs (102) is displayed with only three PSUs (PSU A (104), PSU B (106), and PSU N (108)), one of ordinary skill in the art and having the benefit of this Detailed Description would appreciate that there can be any number of PSUs in the disclosed system to provide power. Similarly, although PSE controller components (114) are shown with only three distinct devices, one of ordinary skill in the art and having the benefit of this Detailed Description would appreciate that there can be any number of PSE controller components in the disclosed system. As another example, although FIG. 1 shows an active supervisor (110) and a passive supervisor (112), there may be only one supervisor, or more than two supervisors, in the system. Additionally, although FIG. 1 shows a powered device connected to each PSE controller component, a given PSE controller component may have any number of powered devices connected, or may have no powered devices connected at a given time, and the number of powered devices connected to a given PSE controller component may vary over time. As another example, although FIG. 1 shows the PSE controller components and the supervisors as separate components, in some embodiments, they may all be a single component, eliminating the need for wired connections between them. As another example, instead of a single wire connection between the PSUs and the supervisor, the supervisor may poll a bus that includes PSU power information, which may be slower than the one wire connection, but still fast enough to allow the supervisor to shed power load and avoid system failure. Accordingly, embodiments disclosed herein should not be limited to the configuration of components shown in FIG. 1.

Figure 2:
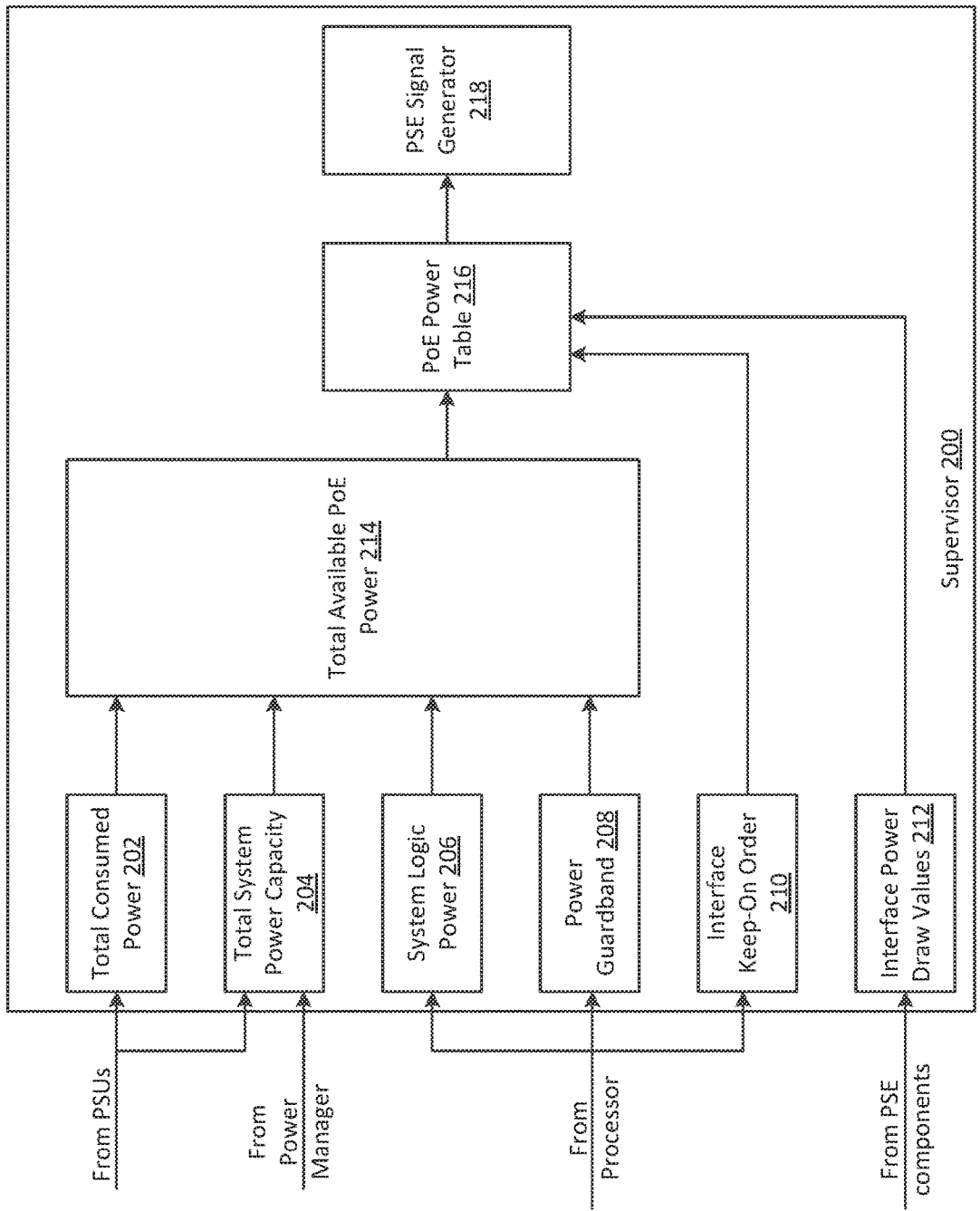
FIG. 2 shows a system in accordance with one or more embodiments disclosed herein.

FIG. 2 shows a supervisor (200) in accordance with one or more embodiments disclosed herein. Specifically, FIG. 2 shows the various types of data provided to the supervisor, including total consumed power (202), total system power capacity (204), system logic power (206), power guard band (208), interface keep-on order (210), and interface power draw values (212), as well as the sources (i.e., PSUs, power manager, processor, PSE controller components) from which they are received by the supervisor. FIG. 2 also shows total available PoE power (214), a PoE power table (216), and a PSE signal generator (218). Each of these components is described below.

In one or more embodiments, the supervisor (200) receives data regarding consumed power from PSUs (described above) which, in aggregate, may be referred to as total consumed power (202). In one or more embodiments, total consumed power (202) is the total amount of power being consumed by various components of the system from the PSUs of the system. Consumed power information may be received by the supervisor (200) via a single wire connection from each PSU of the system. Such a single wire may carry information encoded as a stream of binary digits that encode, among other information, the amount of power a given PSU is actually outputting. Accordingly, the number of bits used to encode the consumed power may be a binary digit string long enough to encode any decimal number ranging from 0 to at least the maximum rated power, in watts, of the PSU. For example, a 12-bit binary digit string may encode any decimal value from 0 to 4095, which would be sufficient for any PSU power rating up to 4095 watts.

In systems and devices not implementing embodiments described herein, PSU output power information may be read by software over a system management bus (SMBus), which takes on the order of 100 microseconds (us). Additionally, with the limits of software, collecting the information from all the PSUs may take 100 milliseconds (ms).

In one or more embodiments, real-time (or near real-time) actual power output is delivered from each PSU, which reduces the latency (e.g., to 3 us) assuming a relatively high signaling frequency (e.g., 10 mega-hertz (MHz) one-wire signaling). In one or more embodiments, a PoE device is able to respond to power changes within the hold-up time windows for PSU overcurrent (e.g., 100 us).

In one or more embodiments, the total system power capacity (204) is a value that represents the maximum amount of power that may be output by the collection of operational PSUs of a PoE system. Such information may be received or derived from various items of information received from the PSUs and/or a power manager.

A power manager may be software executing on the system. In one or more embodiments, the rated power varies according to PSU model number, the voltage of the line providing power to the PSU and/or the temperature of the PSU. In one or more embodiments, the power manager pre-computes the rated power of each PSU and writes it into registers in the control logic of the supervisor (e.g., into registers). For example, a PoE device may have ten PSUs, so there are ten power registers on the supervisor, each with 12 bits able to encode 0-4095W. Additionally or alternatively, available power information may also be encoded as part of the bit stream transmitted via the single wire from each PSU to the supervisor (200) using any number of additional bits.

In one or more embodiments, the supervisor sums together the registers only for PSUs that are delivering power, and the result is the available power. In one or more embodiments, the supervisor is able to discern whether a given PSU is capable of providing power and/or whether it may imminently fail. In one or more embodiments, such information may be discerned, at least in part, because the supervisor receives the input okay and output okay signals from each PSU and uses the signals to determine if the PSU is operational. In one or more embodiments, output okay is the instantaneous status (e.g., the PSU is outputting direct current at a given time), while input okay gives advanced warning that the output current will collapse soon due to lack of input power. If the output current will soon collapse, capacitors in the PSU may provide some amount of hold-up time (e.g., seven ms), during which the supervisor may be capable of sending signals to one or more PSE controller components to stop power to one or more interfaces connected to a powered device based on the relative priorities represented by the interface keep-on order. Each of the input okay and output okay signals may be provided as additional bits in the bit stream provided by the PSUs to the supervisor (200) over the single wire connection between the PSU and the supervisor. The input okay and output okay signals may be represented by any number of bits encoding values that convey 'true' (e.g., DC power is being Output, AC power input is present) or 'false' (e.g., DC power is not being output, AC power input is not present). For example, the input okay signal and output okay signal may be encoded as a single bit, with 0 representing false and 1 representing true. If both values are true, then the supervisor may know that the power supply is present and capable of outputting its rated power and, therefore, that the rated power value for the PSU should be used in the calculation of total system power capacity (204).

In one or more embodiments, the signal from the PSUs in a PSE to the supervisor (200), including at least the input okay, output okay, power consumption, and, optionally, power available to be output, can be implemented with various encodings, such as an analog voltage that varies in some manner (e.g., frequency, amplitude, etc.) that conveys the relevant information, in one or more embodiments, the supervisor uses an Analog to Digital converter to decode such a signal. In one or more embodiments, the signal is a pulse-width-modulated signal where the duty cycle encodes the various items of information. In one or more embodiments, the signal is a one-wire digital signal that sends the information as a binary number. A one-wire digital signal may allow for the signal to be transmitted with low latency and with digital precision. The use of a single wire for transmission of such signals may require a connector to use fewer pins, which may lead to fewer signals on a midplane of a PoE system. In one or more embodiments, the one-wire uses pulse width modulation of the falling edge.

One having ordinary skill in the art will appreciate that although the foregoing description of the signal type for sending information from the PSUs to the supervisor, any type of signal may be used in conjunction with any type of modulation and/or encoding of information to convey the PSU information. For example, a high-level data link control (HDLC) protocol may be used to encode the information. In one or more embodiments, the encoding may ensure that edges are present in the signal that allow the supervisor to read the information from the signal.

In one or more embodiments, system logic power (206) is the amount of power the system allocates for non-PoE system functions (e.g., logic power, fan power, light emitting diodes (LEDs) etc.). In one or more embodiments, system logic power may be provided to the supervisor by software executing on a processor of the PoE system. In one or more embodiments, a processor is any electrical circuit or set of electrical circuits capable of processing data by performing various operations on that data. In one or more embodiments, a processor includes, but is not limited to, an input for receiving data, an output for transmitting processed data, a control unit for extracting instructions, an arithmetic logic unit for performing operations, and a memory component which may further include read-only memory (ROM), random access memory (RAM), and/or cache. Additionally or alternatively, any one or more of the aforementioned components may be operatively connected to rather than included in a processor. As an example, a processor may receive data via any input, store that data internally, perform a set of operations on that data, and then transmit the processed data via an output of the processor. As another example, the processor may be all or any portion of an array of configurable logic blocks of an FPGA. In one or more embodiments, information relating to system logic power is a combination of estimated values and values measured by hardware components and read by the software.

In one or more embodiments, a user and/or software may specify a power guard band (208), which provides a buffer of power to reduce the chance that power events, such as power spikes, will cause the system to consume more power than the total available power. The power guard band (208) may also be provided to the supervisor via software executing on a processor of the PoE system.

In one or more embodiments, the total consumed power (202), the total system power capacity (204), the system logic power (206), and the power guard band (208) values may be used by the supervisor to calculate the total available PoE power. For example, starting with the total system power capacity (204), the supervisor may subtract the power guard band (208) and at least a portion of the maximum system logic power (206). In one or more embodiments, the result is the power remaining for providing power to powered devices. At least some of that power is already being consumed as reflected by the power consumption data of the PSUs. The supervisor (200) may use the total available PoE power in conjunction with information relating to the power being consumed by the connected powered devices to determine whether to shed or add power load. Additionally, if the powered devices are consuming less power than is available, the supervisor (200) may be able to alert software to enable more PSE interfaces to power more powered devices. In one or more embodiments, the total available PoE power (214) is stored in storage of the supervisor (200).

In one or more embodiments, storage is a data repository. In one or more embodiments, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type. In one or more embodiments, the storage includes all or any portion of the persistent and/or non-persistent storage of a supervisor (200).

In one or more embodiments, storage includes, but is not limited to, an input for receiving data, an output for transmitting data, and a computer-readable medium capable of retaining data for use at a later time. One of ordinary skill in the art and having the benefit of this Detailed Description would appreciate that the storage may be located on any other device directly or indirectly connected to the supervisor and is not necessarily a component thereof.

In one or more embodiments, the interface keep-on order is a relative priority ranking of which PSE controller component interfaces to keep on in the case of an adverse power event (e.g., loss of PSU, power spike, oversubscribed powered devices attempting to draw too much power, etc.). In one or more embodiments, the interface keep-on order (210) is provided to the supervisor by software executing on a processor of the PoE, system. In one or more embodiments, the interface keep-on order (210) is updated each time a new interface is added (e.g, a new powered device is plugged in), or an interface is removed (e.g., a powered device is unplugged).

In one or more embodiments, the interface power draw values (212) are the power draw values of each interface providing power to a powered device. In one or more embodiments, the interface power draw values are provided from the PSE controller components, with each PSE controller component providing the values for its interfaces. In one or more embodiments, the interface power draw values (212) are provided as a signal via a single wire connection between each of the PSE controller components and the supervisor, with such a signal being substantially similar to that described above for conveying information from the PSUs to the supervisor (i.e., a one-wire signal).

In one or more embodiments, the PoE power table (216) is a data structure for storing power related information, and may be stored in storage of the supervisor (200). In one or more embodiments, the PoE power table (216) stores the interface keep-on order (210) values for each interface, and the interface power draw values (212) for each interface in entries of the table, along with an interface identifier. An example of an interface identifier may be '5-3', for interface 3 of PSE controller component 5. The PoE power table may also store any of the other data provided to and/or calculated by the supervisor (200).

In one or more embodiments, the PSE signal generator (218) is either included in or operatively connected to the PoE power table (216). In one or more embodiments, the PSE signal generator is logic that takes commands from the supervisor (200) to enable and/or disable one or more interfaces, and convert them into a signal to be transmitted to the one or more PSE controller components that include the one or more interfaces to be enabled or disabled. Such a signal may be transmitted via a single wire connection between the PSE signal generator (218) and each PSE controller component in a manner substantially similar to the transmission of information from the PSUs to the supervisor, as described above. In one or more embodiments, the PSE controller components include functionality to convert the signal into bits that are placed into a shift register, with the value of such bits controlling whether a given interface is enabled or disabled.

While FIG. 2 shows a configuration of components and information, other configurations may be used without departing from the scope of the embodiments disclosed herein. Accordingly, embodiments disclosed herein should not be limited to the configuration of components shown in FIG. 1.

Figure 3:
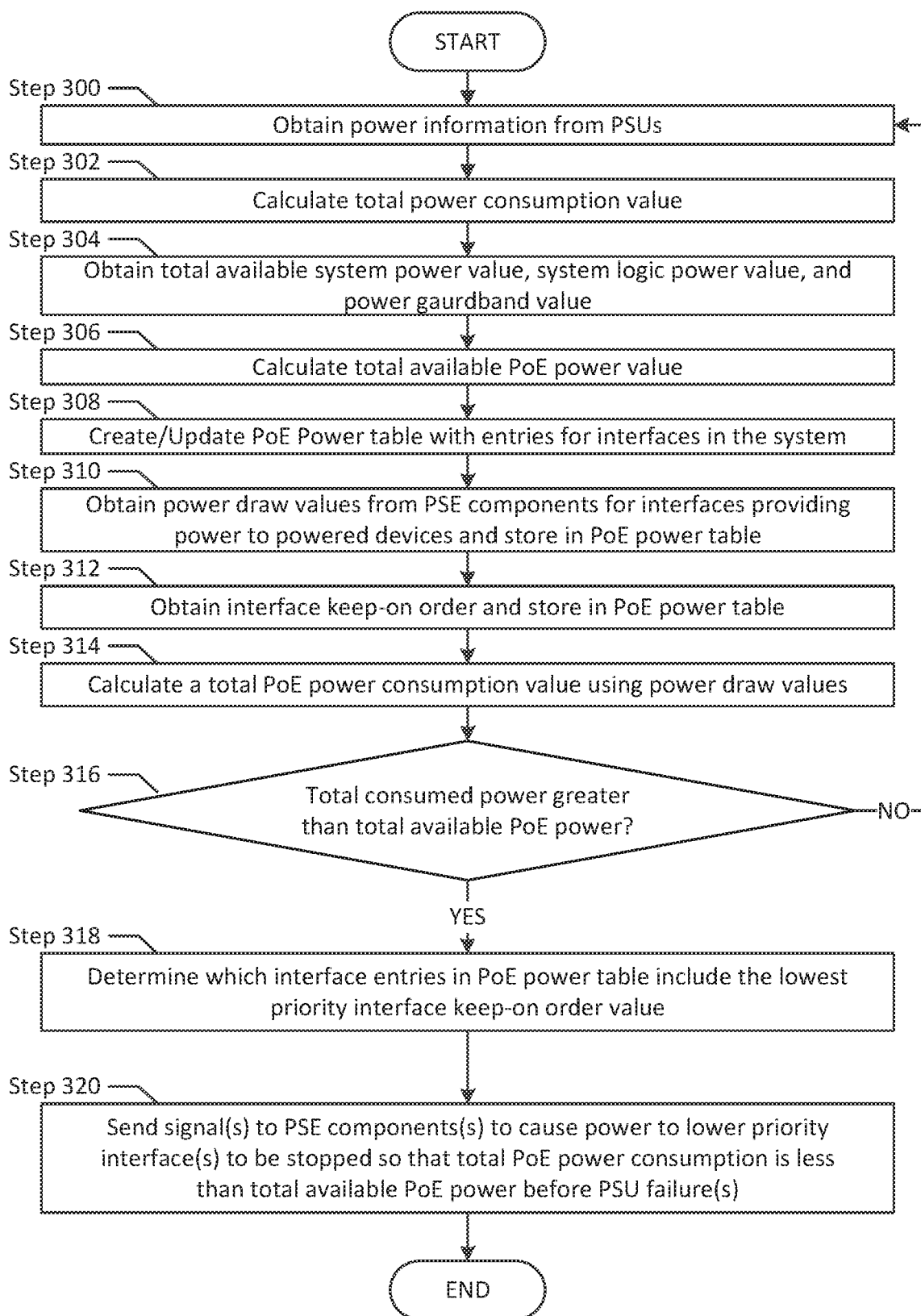
FIG. 3 shows a flowchart in accordance with one or more embodiments disclosed herein.

FIG. 3 shows a flowchart describing a method for receiving, organizing, and analyzing PSU and PSE controller component power information according to one or more embodiments disclosed herein. While the various steps in this flowchart are presented and described sequentially, one of ordinary skill will appreciate that some or all of the steps may be executed in different orders, may be combined or omitted, and some or all of the steps may be executed in parallel.

In Step 300, the supervisor receives PSU data from each PSU. In one or more embodiments, the PSU data is received via an operative connection between the PSUs and a PSU data receiver of the supervisor. For example, information may be received from a PSU via a single wire carrying an information signal that is adjusted, modulated, etc. to convey information (discussed above in the description of FIG. 2).

In one or more embodiments, PSU data relates to power consumption, an input okay signal, an output okay signal, and, optionally, available power capacity, temperature, input line voltage, and/or any other data.

In one or more embodiments, although a PSU may be able to handle a certain maximum power outputcontinuously (e.g., 2,000 W), that PSU may additionally be able to handle surges in power above that maximum (e.g., 4,000 W) for brief periods of time (e.g., 500 µs). In one or more embodiments, PSU data is transmitted from each PSU to a supervisor at time intervals that are less than such a surge window. Accordingly, it may be possible for the supervisor to respond to undesirable power conditions more rapidly and thereby avert a total or partial system shut down. Thus, as data may be transmitted from the PSU to a supervisor in shorter periods of time (e.g., 100 µs, with 3 µs latency), the supervisor may have data related to power surges within the surge window for the PSU and may thus respond appropriately.

In one or more embodiments, the PSU data received in Step 300 is stored in storage. In one or more embodiments, the storage may include a data structure for the PSU data. For example, PSU data may be organized into a table that includes a row for each individual PSU, and the supervisor may write the received PSU data into respective columns for each PSU. Although such a table may have the same number of columns for each PSU row, at least some of the PSU rows may not have data in all columns. One of ordinary skill in the art and having the benefit of this Detailed Description would appreciate that any form of organization may be used to store and organize the data.

In Step 302, the total power consumption value is calculated by the supervisor. As discussed above in the description of FIG. 2, the supervisor may receive the power consumption information from each operational PSU in a PSE in a PoE system, and sum the power consumption values to determine an aggregate power consumption value being output by the PSUs at a given time. In one or more embodiments, due to the nature of the signal being sent directly from the PSUs to the supervisor, the total power consumption value may be updated in real time (or near real-time).

In Step 304, the supervisor obtains a total system power capacity value. As discussed above in the description of FIG. 2, the available power for each power supply may be provided either by software or directly from the PSUs, or may be calculated by the supervisor based on various items of received information. Regardless of where the calculation is performed, the available power for a given PSU may be calculated using a variety of information including, but not limited to, the model number of the PSU (which may be translated into a specified power rating at a given input voltage), the input voltage value, a temperature of the PSU, etc. In one or more embodiments, the available power value for each operational PSU may be stored in any form of storage included in or operatively connected to the supervisor. In one or more embodiments, the total system power capacity calculation also includes the supervisor assessing the input okay and output okay signals received from the PSUs. In one or more embodiments, if input okay is false for a given PSU, then that PSU will not be used for the calculation. In one or more embodiments, if input okay is true and output okay is true for a given PSU, then that PSU will be used in the calculation. If output okay is true, but input okay is not true, then the supervisor may become aware that failure for that PSU is imminent, and respond accordingly to shed some amount of power.

In Step 306, a total available PoE power value is calculated by the supervisor. As discussed above in the description of FIG. 2, to calculate total available PoE power, the supervisor uses instantaneous values for total power consumption, total system power capacity, system logic power, and power guard band. The supervisor may then store the result of the calculation for use in a comparison.

In Step 308, a PoE table is created or updated. A PoE table may be created or initially populated when a PoE system is powered on and/or begins providing power to one or more powered devices. A PoE table is then updated thereafter with any new information that is received. As discussed above in the description of FIG. 2, the PoE power table includes at least an entry for every PoE interface in the system that includes an interface identifier, and, at least for the PoE interfaces providing power to a powered device, an interface keep-on order value and an interface power draw value. A PoE power table may optionally be the storage location for other types of information, such as information obtained or calculated that relates to the PSUs, system logic power, and/or a power guard band for the system.

In Step 310, power draw values are obtained from the one or more PSE controller components of the system that have interfaces providing power to a powered device. In one or more embodiments, a power draw value is received for each such interface and, due to the nature of the signal being transmitted directly from the PSE controller components to the supervisor, may be updated in real-time (or near real-time). Each time a new power draw value for a given interface is received, the supervisor may update the relevant entry in the PoE power table to reflect the new power draw value.

In Step 312, the supervisor obtains the interface keep-on order. Once received, the supervisor stores the interface keep-on order value for each interface in the relevant entry in the PoE power table. The interface keep-on values in the PoE power table may be updated from time to time if a user or software changes the relative priorities of attached powered devices, if new interfaces are added, and/or if interfaces are removed.

In Step 314, the supervisor calculates a total PoE power consumption. As discussed above in the description of FIG. 2, the total PoE power consumption value may be calculated by summing the values in each entry of the PoE power table for the individual interfaces that are providing power to a powered device.

In Step 316, a determination is made whether the total consumed power is greater than the total available PoE power. In one or more embodiments, if the total consumed power is not greater than the total available PoE power, then the process returns to Step 300, and the supervisor continues to obtain information from PSUs and the above-described other types of information, continues to update the PoE power table, and continues to recheck whether the total consumed power is greater than the total available PoE power on a real-time (or near real-time) basis. If the total consumed power is greater than the total available PoE power, the method proceeds to Step 318.

In Step 318, the supervisor determines which interfaces should stop providing power to powered devices, which will decrease the power load on the system. In one or more embodiments, the supervisor checks the keep-on order values for each of the interfaces to determine which have been given the lowest priorities. In one or more embodiments, the supervisor selects enough interfaces, starting with the lowest priority interface and working up the priority list, to shed enough power loads to avoid system failure. In one or more embodiments, the per interface granularity of the supervisors ability to shed power load provides the PoE system the capability to provide power to the maximum number of powered devices at any time while avoiding a potential system failure due to PSU failures.

In Step 320, the supervisor sends a signal to each PSE controller component that includes an interface identified in Step 318 to cause the PSE controller components to have the relevant interface(s) stop providing power to connected powered device(s). In one or more embodiments, the signal sent by the supervisor is processed by the PSE controller component and parsed into bits to place in a shift register. In such embodiments, the value of such bits controls how many interfaces of the PSE controller component should be powered down, which is performed in accordance with the interface keep-on order of the PSE controller component, which has been previously programmed to the PSE controller component, and which is kept coherent with the interface keep-on values of the PoE power table.

As an example, a PSE controller component may have less input pins (e.g., four) than quantity of PoE interfaces (e.g., eight). In such an example, the signal from the supervisor may include information expressed as a series of bits whose quantity matches the number of input pins. In one or more embodiments, the bits may be used to represent a quantity of interfaces to be powered down, which would be done in the order represented by the aforementioned interface keep-on order. In one or more embodiments, a set of four bits could range from 0000 to 1111, thereby allowing for up to 16 combinations of certain interfaces being turned off in one or more embodiments, the series of bits may indicate that all the interfaces should be powered, that none of the interfaces should be powered, or that any quantity between none and all should be powered.

FIG. 6 shows a table (600) that shows a non-limiting example of a system with a PSE controller component having four input pins and an interface keep-on order. The left most column represents the value of the four bits sent by the supervisor as a hexadecimal number. Each row represents which interfaces are on or off when each value between 0 and 8 is sent by the supervisor to a given PSE controller component having eight interfaces.

Figure 4:
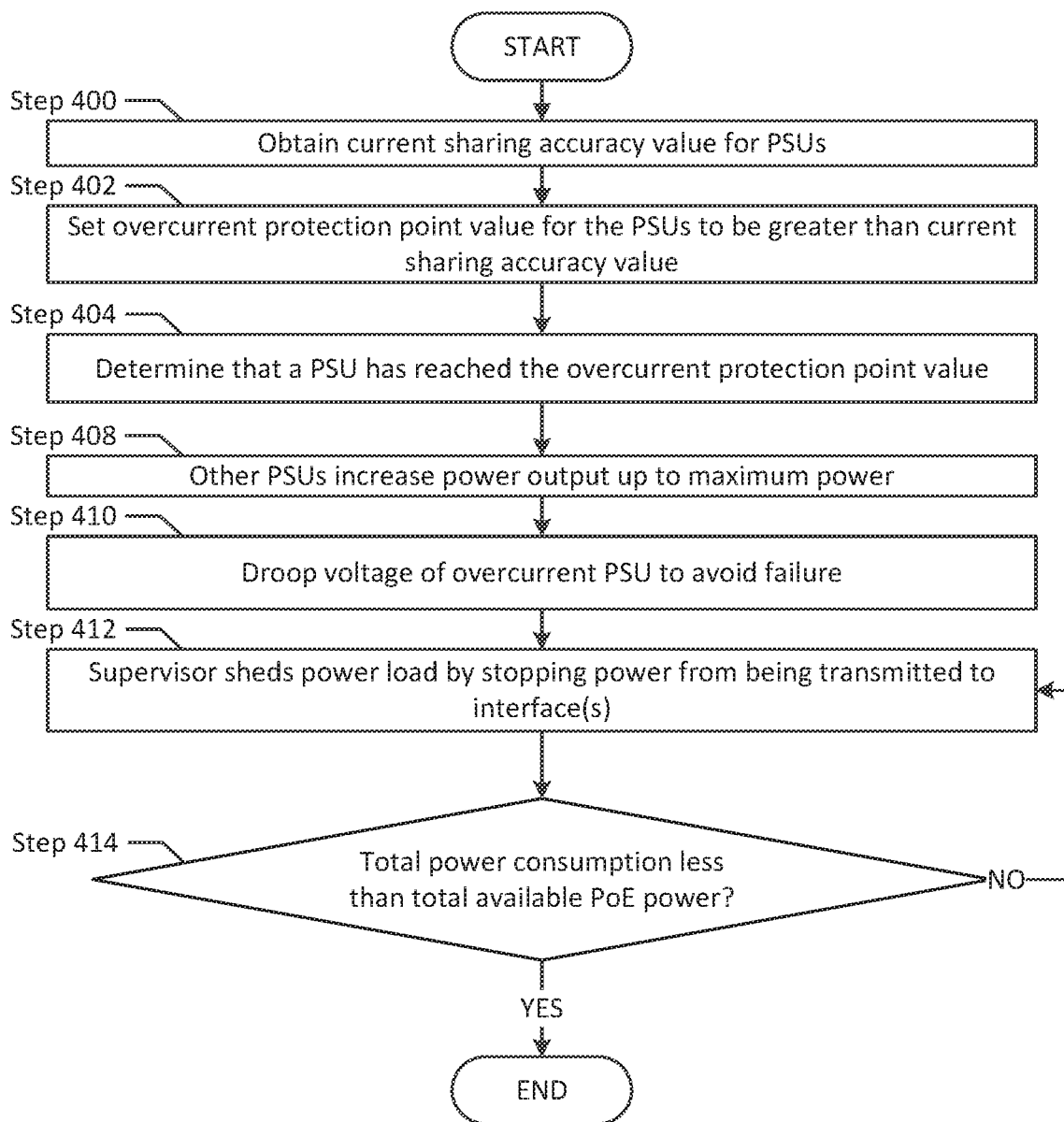
FIG. 4 shows a flowchart in accordance with one or more embodiments disclosed herein.

FIG. 4 shows a flowchart describing a method for a set of PSUs to respond to a given PSU reaching an overcurrent protection point by increasing power output up to their respective maximum power ratings in order to better distribute the power load and avoid failure of the system that occurs when a portion of the PSUs still have available power capacity. While the various steps in this flowchart are presented and described sequentially, one of ordinary skill will appreciate that some or all of the steps may be executed in different orders, may be combined or omitted, and some or all of the steps may be executed in parallel.

In Step 400, a current sharing accuracy value (which may alternatively be referred to as a current sharing error value) is obtained for the PSUs. In one or more embodiments, a current sharing accuracy value is a result of the design of the PSUs, and is included in the specification of PSUs provided by manufacturers of the PSUs. In one or more embodiments, the current sharing accuracy value is expressed as a percentage that represents the imperfectness of current sharing between the PSUs.

In Step 402, an overcurrent protection point value is set for the PSUs that is a percentage above the current rating of the PSU, with that percentage being greater than the percentage representing the current sharing accuracy value.

In Step 404, it is determined that a PSU of the set of PSUs has reached the overcurrent protection point value set in Step 402. In one or more embodiments, once the overcurrent protection point is reached, the PSU experiencing the overcurrent becomes a master PSU in that it begins to affect the power output of the other PSUs.

In Step 408, the other PSUs are configured to respond to the PSU experiencing the overcurrent to raise their respective power outputs up to their respective maximum rated powers. In doing so, the other power supplies may begin to regulate the voltage of the PSU experiencing the overcurrent situation by taking more of the power load of the PoE system.

In Step 410, if necessary, the PSU experiencing the overcurrent situation is configured to droop (i.e., lower) its voltage output so that the power output, which is a product of the current output and the voltage output, does not exceed the rated maximum power.

In Step 412, the supervisor becomes aware, due to the real-time (or near real-time) provision of PSU power information from the PSUs to the supervisor, that the PSU is in an overcurrent situation because as the other PSUs reach maximum power, the total consumed power value will exceed the total available PoE power of the system. In one or more embodiments, once the supervisor becomes aware of the situation, the supervisor will begin to cause interfaces of PSE controller components to stop providing power to powered devices until the total power consumption value reduces to an acceptable level, and the PSU that was experiencing the overcurrent situation returns to within its rating limit.

In Step 414, a determination is made whether the total power consumption is less than the total available PoE power. If the total power consumption is not less than the total available PoE power, the process returns to Step 112 and the supervisor sheds more power loads. If the total power consumption is less than the total available PoE power, the process ends.

Figure 5:
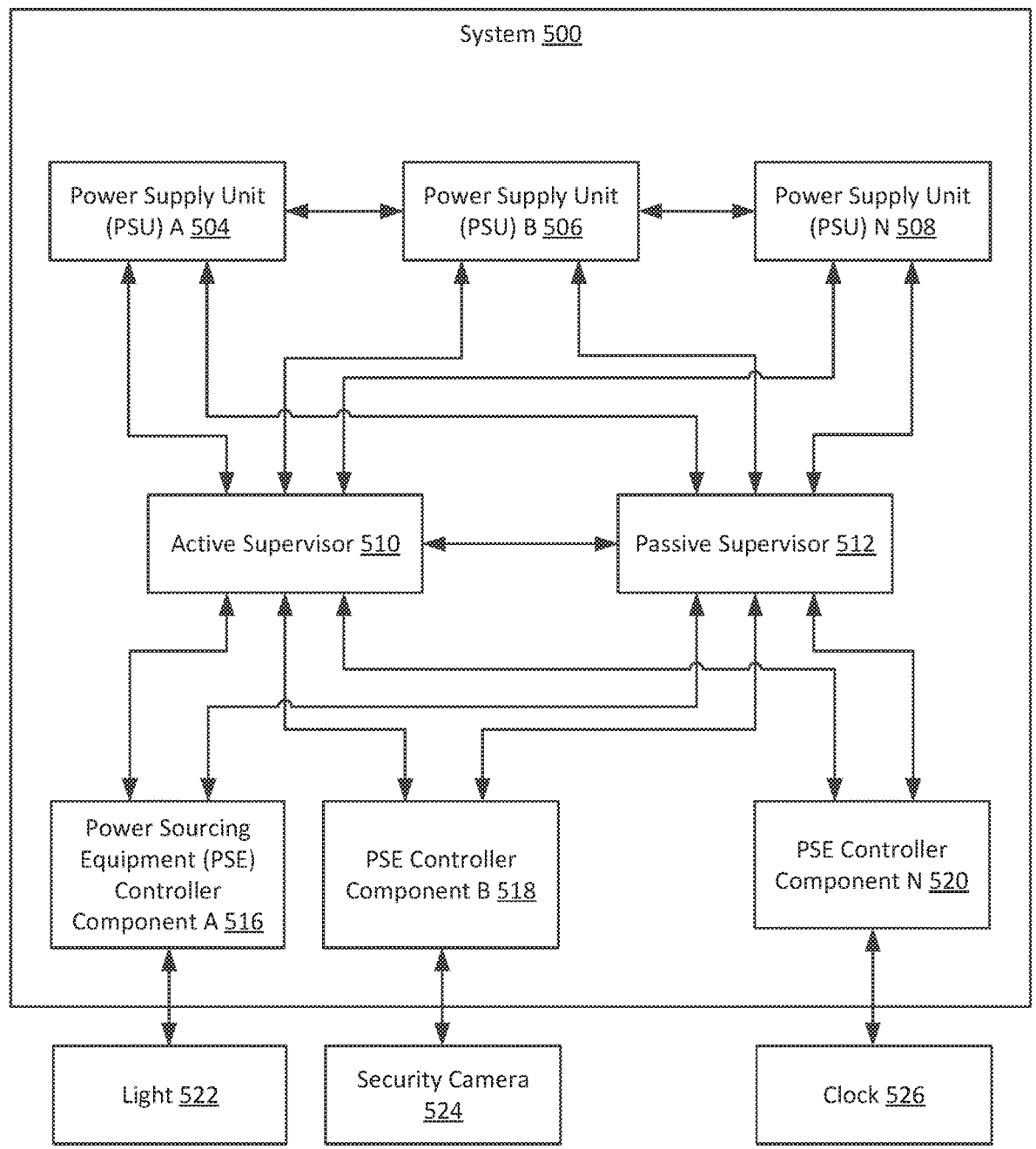
FIG. 5 shows an example in accordance with one or more embodiments disclosed herein.

FIG. 5 shows an example in accordance with one or more embodiments described herein. The following example scenarios are for explanatory purposes only and not intended to limit the scope of embodiments described herein. Additionally, while the example scenarios shows certain aspects of embodiments described herein, all possible aspects of such embodiments may not be illustrated in this particular example.

Referring to FIG. 5, consider a scenario in which a PoE system (500) includes 3 PSUs (504, 506, 508) for providing power to various powered devices (e.g., light (522), security camera (524), clock (526)) via interfaces (not shown) of PSE controller components (516, 518, 520). The PoE system (500) also includes an active supervisor (510) and a passive supervisor (512). The three powered devices shown in FIG. 5, along with a collection of powered devices that are not shown, are oversubscribed, meaning that the PoE system (500) cannot provide enough power to provide the allocated power to all powered devices at the same time.

In such a scenario, the PSUs (504, 506, 508) are providing real-time (or near real-time) power information to the supervisors (510, 512), including power consumption data, an input okay signal, and an output okay signal. The supervisors (510, 512) are also receiving, from various software executing on the PoE system, available power values for each PSU, which is stored in registers of the supervisors, and used to calculate total system power capacity. The supervisors (510, 512) are also receiving system logic power and power guard band values, which are used to calculate total available PoE power for the PoE system (500).

Additionally, the supervisor includes a PoE power table with an entry for the interfaces of the system. The entries for the interfaces to which those powered devices are connected are populated with interface keep-on order values, including the light (522), the security camera (524), and the clock (526). The relative priority order has the security camera as the highest priority, the clock as the middle priority, and the light as the lowest priority. The entries for the powered devices are also populated with power draw values for each device, which are provided in real-time (or near real-time) to the supervisors (510, 512) by the PSE controller components (516, 518, 520).

At a first time, the power being provided to the clock (526) spikes to more than the power allocated for the clock. In response the PSE controller component (520) automatically shuts the interface down. Later, after a short circuit was discovered in the clock, the clock is repaired, and software re-enables the interface to which the clock is connected.

At a second later time, all three powered devices (522, 524, 526) increase their power draw from less than they have been allocated to close to the maximum allocation. However, the increased power values do not cause the consumed power to be greater than the total available PoE power, and the increase is absorbed by the power guard band.

At a third later time, a variety of other powered devices increase their power draw. This causes one or more PSUs to send increased power consumption values to the supervisor. One of the PSUs reaches an overcurrent point value, and sends information to the other PSUs, which respond by increasing their power output to maximum rated power. At this point, the supervisors (510, 512) compare the total available PoE power to the total consumed power and determines that the consumed power exceeds the available power. Accordingly, the active supervisor (510) consults the PoE power table to determine that the three lowest priority powered devices are the light (522), the security camera (524) and the clock (526). Based on the amount the consumed power exceeds the available power, the active supervisor (510) determines that the two lowest priority powered devices, the clock (526) and the light (522) are consuming enough power that, if the interface they are connected to is disabled, would bring the power consumption value down to an acceptable level, bring the PSU experiencing overcurrent back within rated levels, and avoid cascading failures of the PSUs (504, 506, 508). Accordingly, the active supervisor (510) sends a signal to PSE controller component (520) and PSE controller component (516) to cause the PSE controller components to disable the interfaces to which the clock and the light are connected.

The PSE controller components receive the signal, and update the contents of a shift register to include a 0 (indicating 'disable') in appropriate locations to cause the disabling of the interfaces connected to the clock and the light. Because the two interfaces are disabled in a time window that is less than the time the overcurrent PSU can sustain the increased load, system failure is avoided.

While the embodiments disclosed herein has been described with respect to a limited number of embodiments and examples, those skilled in the art, and having benefit of this Detailed Description, will appreciate that other embodiments can be devised which do not depart from the scope of the embodiments disclosed herein. Accordingly, the scope of the embodiments disclosed herein should be limited only by the attached claims.

What is claimed is:

1. A method for power management for a Power over Ethernet (PoE) device, the method comprising:
   obtaining, by a supervisor, power information from a plurality of power supply units (PSUs) to obtain total consumed power;
   obtaining, by the supervisor, a total system power capacity value associated with the plurality of PSUs;
   calculating, by the supervisor, a total available PoE power value using the total consumed power and the total system power capacity value; and
   making a first determination, by the supervisor, using the total available PoE power value and a PoE power table, that a powered device should stop receiving power;
   obtaining a current sharing accuracy value for a PSU of the plurality of PSUs;
   setting an overcurrent protection point value for the PSU that is greater than a maximum current rating of the PSU by at least the current sharing accuracy value;
   making a second determination, by the PSU, that the PSU has a current that is greater than the overcurrent protection point value, wherein the other PSUs adjust power output for each of the other PSUs to be substantially a maximum rated power of each of the other PSUs;
   drooping, by the PSU, the PSU voltage value to avoid a failure of the PSU; and
   causing, by the supervisor, the powered device to stop receiving power, wherein the powered device stops receiving the power within a failure time limit of the PSU, which causes the current of the PSU to return below a current rating of the PSU before the failure.

2. The method of claim 1, further comprising:
   obtaining, by the supervisor, a system logic power value; and
   obtaining, by the supervisor, a power guardband value,
   wherein calculating the total available PoE power value comprises the supervisor also using the system logic power value and the power guardband value.

3. The method of claim 2, wherein calculating the total available PoE power value further comprises subtracting, from the total system power capacity value, the total consumed power, the power guardband value, and at least a portion of the system logic power value.

4. The method of claim 1, wherein the PoE power table comprises:
a first entry comprising a first PoE interface identifier, a first power draw value associated with the first PoE interface identifier, and a first interface keep-on order value; and
a second entry comprising a second PoE interface identifier, a second power draw value associated with the second PoE interface identifier, and a second interface keep-on order value.

5. The method of claim 4, wherein:
the first power draw value is obtained by the supervisor from a first power sourcing equipment (PSE) controller component comprising a first PoE interface associated with the first PoE interface identifier;
the second power draw value is obtained by the supervisor from a second PSE controller component comprising a second PoE interface associated with the second PoE interface identifier; and
the first interface keep-on order value and the second interface keep-on order value are obtained from a keep-on order manager.

6. The method of claim 5, wherein:
the first determination comprises a decision that the powered device should stop receiving power,
the powered device is operatively connected to the first PoE interface associated the first PoE interface identifier,
making the first determination comprises the supervisor making a second determination that the first interface keep-on order value indicates a higher priority than the second interface keep-on order value, and
the method further comprises causing the first PoE interface to stop providing power to the powered device.

7. The method of claim 6, further comprising:
making a third determination, by the supervisor, that stopping providing power to the powered device did not bring total PoE port power consumption below the total available PoE power value; and
in response to the third determination, causing the second PoE interface to stop providing power to a second powered device.

8. The method of claim 1, wherein obtaining the total system capacity power value comprises:
obtaining a set of input voltages, wherein each input voltage of the set of input voltages is associated with a different PSU of the plurality of PSUs;
obtaining a set of power output ratings, wherein each power output rating of the set of power output ratings is associated with a different PSU of the plurality of PSUs;
obtaining a set of input okay signals, wherein each input okay signal of the set of input okay signals is associated with a different PSU of the plurality of PSUs;
obtaining a set of output okay signals, wherein each output okay signal of the set of output okay signals is associated with a different PSU of the plurality of PSUs; and
calculating the total system power capacity value using the set of input voltages, the set of power output ratings, the set of input okay signals, and the set of output okay signals.

9. The method of claim 8, wherein calculating the total system power capacity value using the set of input voltages, the set of power output ratings, the set of input okay signals, and the set of output okay signals comprises:
making a second determination whether a PSU of the plurality of PSUs is operational using an input okay signal of the set of input okay signals that is associated with the PSU and an output okay signal of the set of the output okay signals that is associated with the PSU; and
calculating a maximum power output associated with the PSU using an input voltage of the set of input voltages that is associated with the PSU and a power output rating of the set of power output ratings that is associated with the PSU.

10. A system for power management for a Power over Ethernet (PoE) device, the system comprising:
a plurality of power supply units (PSUs);
a power sourcing equipment (PSE) controller component comprising a plurality of Power over Ethernet (PoE) interfaces, wherein each PoE interface of the plurality of PoE interfaces is operatively connected to a different powered device of a set of powered devices; and
a system controller operatively connected to the plurality of PSUs and the PSE controller component and configured to:
obtain power information from the plurality of PSUs to obtain total power;
obtain a total system power capacity value associated with the plurality of PSUs, wherein to obtain the total system power capacity value the system controller is further configured to:
obtain a set of input voltages, wherein each input voltage of the set of input voltages is associated with a different PSU of the plurality of PSUs;
obtain a set of power output ratings, wherein each power output rating of the set of power output ratings is associated with a different PSU of the plurality of PSUs;
obtain a set of input okay signals, wherein each input okay signal of the set of input okay signals is associated with a different PSU of the plurality of PSUs;
obtain a set of output okay signals, wherein each output okay signal of the set of output okay signals is associated with a different PSU of the plurality of PSUs; and
calculate the total system power capacity value using the set of input voltages, the set of power output ratings, the set of input okay signals, and the set of output okay signals;
calculate a total available PoE power value using the total consumed power and the total system power capacity value;
make a first determination using the total available PoE power value and a PoE power table, whether a powered device should stop receiving power; and
provide a signal to the PSE controller component in response to the first determination indicating the powered device should stop receiving power, the signal causing the PSE controller component to stop providing power to the PoE interface coupled to powered device in the set of power devices that is to stop receiving power.

11. The system of claim 10, wherein the system controller is further configured to:
obtain a system logic power value; and
obtain a power guardband value,
wherein calculating the total available PoE power value comprises the system controller also using the system logic power value and the power guardband value.

12. The system of claim 11, wherein calculating the total available PoE power value further comprises subtracting, from the total system power capacity value, the total consumed power, the power guard band value, and at least a portion of the system logic power value.

13. The system of claim 10, wherein the PoE power table comprises:
a first entry comprising a first PoE interface identifier, a first power draw value associated with the first PoE interface identifier, and a first interface keep-on order value; and
a second entry comprising a second PoE interface identifier, a second power draw value associated with the second PoE interface identifier, and a second interface keep-on order value.

14. The system of claim 13, wherein:
the first power draw value is obtained by the system controller from the PSE controller component comprising a first PoE interface of the plurality of PoE interfaces that is associated with the first PoE interface identifier,
the second power draw value is obtained by the system controller from a second PSE controller component comprising a second PoE interface of the plurality of PoE interfaces associated with the second PoE interface identifier; and
the first interface keep-on order value and the second interface keep-on order value are obtained from a keep-on order manager.

15. The system of claim 14, wherein:
the first determination comprises a decision that the powered device should stop receiving power;
the powered device is operatively connected to the first PoE interface associated the first PoE interface identifier, and
to make the first determination, the system controller is further configured to:
make a second determination that the first interface keep-on order value indicates a higher priority than the second interface keep-on order value; and
based on the second determination, cause the first PoE interface to stop providing power to the powered device.

16. The system of claim 15, wherein the system controller is further configured to:
make a third determination that stopping providing power to the powered device did not bring total PoE port power consumption below the total available PoE power value; and
in response to the third determination, cause the second PoE interface to stop providing power to a second powered device.

17. The system of claim 10, wherein:
the first determination comprises a decision that the powered device should stop receiving power, and
the system controller is further configured to:
obtain a current sharing accuracy value for a PSU of the plurality of PSUs;
set an overcurrent protection point value for the PSU that is greater than the current sharing accuracy value;
make a second determination, by the PSU, that the PSU has a current that is associated with the overcurrent protection point value, wherein the other PSUs adjust power output for each of the other PSUs to be substantially a maximum rated power of each of the other PSUs;
droop, by the PSU, the PSU voltage value to avoid a failure of the PSU; and
cause, by the system controller, the powered device to stop receiving power, wherein the powered device stops receiving the power within a failure time limit of the PSU, which causes the current of the PSU to return below a current rating of the PSU before the failure.

18. The system of claim 10, wherein, to calculate the total available system power value using the set of input voltages, the set of power output ratings, the set of input current okay signals, and the set of output okay signals, the system controller is further configured to:
make a second determination whether a PSU of the plurality of PSUs is operational using an input okay signal of the set of input okay signals that is associated with the PSU and an output okay signal of the set of output okay signals that is associated with the PSU; and
calculate a maximum power output associated with the PSU using an input voltage of the set of input voltages that is associated with the PSU and a power output rating of the set of power output ratings that is associated with the PSU.

19. A method for power management for a Power over Ethernet (PoE) device, the method comprising:
obtaining, by a system controller, power information from a plurality of power supply units (PSUs) to obtain total consumed power;
obtaining, by the system controller, a total system power capacity value associated with the plurality of PSUs, the total system power capacity value being determined by the system controller by:
obtaining a set of input okay signals from the plurality of PSUs, each input okay signal indicating whether a corresponding PSU is receiving valid input power;
obtaining a set of output okay signals from the plurality of PSUs, each output okay signal indicating whether a corresponding PSU is providing valid output power;
calculating the total system power capacity value using only each PSU in the plurality of PSUs for which the corresponding input okay and output okay signals indicate the PSU is operational;
calculating, by the system controller, a total available PoE power value using the total consumed power and the total system power capacity value;
making a first determination, by the system controller, using the total available PoE power value and a PoE power table, whether a powered device should stop receiving power;
stopping, by the system controller, the providing of power to the powered device in response to the first determination indicating the powered device should stop receiving power.

20. The method of claim 19, further comprising:
obtaining a set of input voltages, wherein each input voltage of the set of input voltages is associated with a different PSU of the plurality of PSUs;
obtaining a set of power output ratings, wherein each power output rating of the set of power output ratings is associated with a different PSU of the plurality of PSUs; and
wherein calculating the total system power capacity value comprises calculating the total system power capacity value based on the set of input voltages, the set of power output ratings, the set of input okay signals, and the set of output okay signals.

\* \* \* \* \*